(12) United States Patent
Beck et al.

(10) Patent No.: US 8,796,366 B2
(45) Date of Patent: Aug. 5, 2014

(54) EASILY DISPERSIBLE SOLID PIGMENT PREPARATIONS

(75) Inventors: Dietmar Beck, Frankfurt am Main (DE); Uwe Bechtold, Frankfurt am Main (DE); Bjoern Fechner, Wasbek (DE); Jesus Pitarch-Lopez, Frankfurt am Main (DE)

(73) Assignee: Clariant Finance (BVI) Limited, Tortola (VG)

( * ) Notice: Subject to any disclaimer, the term of this patent is extended or adjusted under 35 U.S.C. 154(b) by 206 days.

(21) Appl. No.: 13/146,740

(22) PCT Filed: Jan. 7, 2010

(86) PCT No.: PCT/EP2010/000024
§ 371 (c)(1),
(2), (4) Date: Jul. 28, 2011

(87) PCT Pub. No.: WO2010/091766
PCT Pub. Date: Aug. 19, 2010

(65) Prior Publication Data
US 2011/0288209 A1 Nov. 24, 2011

(30) Foreign Application Priority Data

Feb. 12, 2009 (DE) .................. 10 2009 008 740

(51) Int. Cl.
| | |
|---|---|
| *C09B 67/08* | (2006.01) |
| *C09B 67/04* | (2006.01) |
| *C09B 67/00* | (2006.01) |
| *C09B 67/46* | (2006.01) |
| *C08K 5/07* | (2006.01) |
| *G03G 9/087* | (2006.01) |
| *G03G 9/09* | (2006.01) |
| *C08K 5/3437* | (2006.01) |
| *C09D 11/02* | (2014.01) |
| *C09D 5/02* | (2006.01) |

(52) U.S. Cl.
CPC ......... *C09B 67/0013* (2013.01); *C09B 67/0002* (2013.01); *C09B 68/4253* (2013.01); *C09B 67/009* (2013.01); *G03G 9/08722* (2013.01); *G03G 9/091* (2013.01); *C08K 5/3437* (2013.01); *C09D 11/02* (2013.01); *C09D 5/02* (2013.01); *C08K 5/07* (2013.01)
USPC .............. 524/90; 524/358; 524/547

(58) Field of Classification Search
CPC ........ C08K 5/3437; C08K 5/07; C09D 11/02; C09D 5/02; C09D 11/30; C09B 67/0002; C09B 67/0013; C09B 67/009

USPC ............................. 524/90, 358, 547
See application file for complete search history.

(56) References Cited

U.S. PATENT DOCUMENTS

| | | | |
|---|---|---|---|
| 3,547,899 A * | 12/1970 | Glabisch et al. .............. 526/287 |
| 4,156,616 A | 5/1979 | Dietz et al. |
| 4,309,327 A * | 1/1982 | Ishikura et al. ............. 524/547 |
| 7,842,757 B2 | 11/2010 | Roy et al. |
| 8,124,672 B2 | 2/2012 | Reisacher |
| 2006/0000392 A1 | 1/2006 | Reisacher et al. |
| 2006/0047062 A1 | 3/2006 | Hsu et al. |
| 2006/0142416 A1* | 6/2006 | Sakai et al. ................... 523/160 |
| 2007/0287817 A1 | 12/2007 | Maier et al. |
| 2009/0030139 A1 | 1/2009 | Roy et al. |
| 2011/0046274 A1 | 2/2011 | Plueg et al. |
| 2011/0218289 A1 | 9/2011 | Maier et al. |

FOREIGN PATENT DOCUMENTS

| | | |
|---|---|---|
| DE | 1595680 | 4/1970 |
| DE | 2638946 | 3/1978 |
| DE | 102004032399 | 2/2006 |
| EP | 0796876 | 9/1997 |
| EP | 796876 A1 * | 9/1997 |
| EP | 1132434 | 9/2001 |
| GB | 2014326 | 8/1979 |
| WO | WO 2004/046251 | 6/2004 |
| WO | WO 2004/074383 | 9/2004 |
| WO | WO 2007039603 | 4/2007 |

OTHER PUBLICATIONS

PCT International Search Report for PCT/EP 2010/000024, mailed Jul. 13, 2010.
PCT International Preliminary Report on Patentability for PCT/EP 2010/000024, mailed Aug. 16, 2011.
Yotaro, "Self-Assembling Amphiphilic Polyelectrolytes and their Nanostructures" Chinese Journal of Polymer Science Zhongguo Huakuehui, CN, vol. 18, No. 40; pp. 323-336, XP009107054 (Jan. 1, 2000).

* cited by examiner

Primary Examiner — Michael M Bernshteyn
(74) *Attorney, Agent, or Firm* — Anthony A. Bisulca

(57) ABSTRACT

The present invention relates to solid pigment preparations containing (A) 5 to 99 percent by weight of at least one pigment; (B) 1 to 95 percent by weight of at least one water-soluble dispersing additive based on copolymers that consist of the following structural units: (i) 1.0 to 50 mol percent of structural unit B1; a combined total of 50 to 99.0 mole percent of structural units (B2) and (B3); (iii) 0 to 49 mole percent of structural unit (B4).

15 Claims, No Drawings

EASILY DISPERSIBLE SOLID PIGMENT PREPARATIONS

The present invention relates to solid pigment preparations comprising dispersing additives based on water-soluble polymers comprising sulfonate groups and to the use of said solid pigment preparations for coloring natural and synthetic materials.

Quality in the production of pigmented coatings is decisively dependent upon achieving a fine and uniform distribution of the particles of solid material in the coating system. If the particles of pigment are not optimally dispersed and stabilized in the application system, flocculation phenomena and sedimenting can occur and can lead to undesirable changes in the viscosity of the application system, to hue changes and losses of color strength, hiding power, luster, homogeneity, brilliance and also poorly reproducible hues and to higher tendency to sag in the case of finishes. To facilitate fine dispersion and stabilization of pigments in paint systems, printing inks and finishes and hence to achieve optimum performance characteristics, wetting and dispersing agents are frequently used. Dispersing organic pigments in an application system is a critical and far from straightforward operation. In general, pigments are incorporated in a liquid phase in combination with dispersing and wetting agents through the use of energy-intensive ball mills, stirred media mills or high-performance bead mills. One way to make the pigmentation of paint systems, printing inks and finishes more efficient and less cost and energy intensive consists in using easily dispersible solid pigment preparations which can be incorporated in the application system with significantly lower energy input and faster color development then conventional pigments, which is of substantial economic advantage.

WO 2004/046251 describes solid pigment preparations comprising water-soluble anionic additives based on homo- and copolymers of ethylenically unsaturated mono- and/or dicarboxylic acids.

WO2004/074383 discloses solid pigment preparations which are only easily dispersible in solvent-containing application media.

EP-A1-1 132 434 discloses the production of easily dispersible pigment preparations by using dispersants based on aromatic polyalkylene glycols. These preparations are only compatible with aqueous application systems.

The solid pigment preparations described in WO 2007/039603 provide an improvement regarding compatibility in application media differing in polarity. The dispersing additives used for producing such pigment preparations consist of a polymeric backbone synthesized by chain reaction and bearing side chains based on hydrophilic polyethers. The reaction product of a styrene-maleic anhydride copolymer with a polyether amine is mentioned as an example of such dispersing additives. Dispersion in very hydrophobic finish systems, such as solventborne industrial finishes based on long oil alkyd resins for example, is not sufficient. US 2006/0142416 discloses dispersible colorants consisting of pigments and copolymers having a sulfonate group content at the pigment surface of above 100 μmol/g, for exclusively aqueous inkjet inks. These dispersible colorants are manufactured using a costly and inconvenient method, however. First, the pigment has to be dispersed using dispersant auxiliaries and high energy input and then monomers are added to the pigment dispersion and polymerized for several hours. The colorants are isolated after several centrifugation and washing steps.

There is a need for pigment preparations with easy dispersibility in both aqueous and solvent-containing application media. Such pigment preparations shall be universally compatible and their incorporation shall take place easily and without additional steps irrespective of the application medium. Easily dispersible is to be understood as meaning that the pigment is incorporable in the application system with very low energy input and intensive and rapid color development. Gentle shearing forces, for example the action of a dissolver (saw-tooth stirrer), shall be sufficient to achieve complete dispersal of the pigment, removing the need for any further cost-intensive dispersing steps.

We have found that, surprisingly, the hereinbelow defined solid pigment preparations are easily dispersible in both aqueous and apolar solvent-containing application media and hence achieve the abovementioned object.

The present invention provides solid pigment preparations comprising (A) from 5% to 99% by weight and preferably from 40% to 99% by weight of at least one pigment other than C. I. Pigment Blue 15:3, (B) from 1% to 95% by weight and preferably from 1% to 60% by weight of at least one water-soluble dispersing additive based on copolymers consisting of the following structural units:

(i) from 1.0 to 50 mol % and preferably from 5 to 30 mol % of structural unit B1

(ii) from 50 to 99.0 mol % and preferably from 60 to 95 mol % of structural units B2 and B3 in a total whereof from 0 to 100 mol % of said structural unit B2 and from 0 to 100 mol % of said structural unit B3 can be present,

(iii) from 0 to 49 mol %, for example from 1 to 20 mol %, of structural unit B4

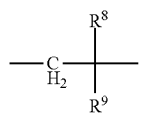
(B4)

where
$R^1$, $R^4$, $R^6$ and $R^8$ are each independently hydrogen or $C_1$-$C_4$-alkyl,
$R^2$ is a covalent bond, $C_1$-$C_4$-alkylene, $C_1$-$C_4$-alkylene-$C_6$-$C_{12}$-arylene, $C_6$-$C_{30}$-arylene or the radical

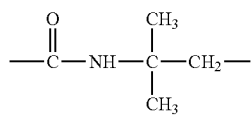

$R^3$ is hydrogen, $Na^+$, $K^+$ or $N(R^1)_4^+$,
$R^5$ and $R^7$ are each independently linear or branched $C_1$-$C_{40}$-alkyl, $C_5$-$C_{30}$cycloalkyl, $C_1$-$C_4$-alkylene-$C_6$-$C_{12}$-aryl or $C_6$-$C_{33}$-aryl, and
$R^9$ is hydrogen, linear or branched $C_1$-$C_{40}$-alkyl, $C_5$-$C_{30}$-cycloalkyl, $C_6$-$C_{30}$-aryl, $C_1$-$C_4$-alkylene-$C_6$-$C_{12}$-aryl, —F, —Cl, —Br, —OH or —CN,
and where aryl may be substituted with $C_1$-$C_4$-alkyl groups;
(C) from 0% to 30% by weight and preferably from 0.1% to 10% by weight of an auxiliary from the group consisting of fillers, flame retardants, preservatives, photoprotectants, pigmentary and nonpigmentary dispersants, surfactants, antioxidants, defoamers, resins and antistats,
all based on the total weight of the pigment preparation,
and where the sulfonate group content of (B1) is greater than 1 μmol and less than 100 μmol per gram of solid pigment preparation, preferably in the range from 3 to 98 μmol/g and more preferably in the range from 9 to 95 μmol/g.

Organic pigments (A) are preferred. Suitable organic pigments include monoazo, disazo, laked azo, β-naphthol, Naphthol AS, benzimidazolone, disazo condensation, azo metal complex pigments and polycyclic pigments such as, for example, phthalocyanine, except C. I. Pigment Blue 15:3, quinacridone, perylene, perinone, thioindigo, anthanthrone, anthraquinone, flavanthrone, indanthrone, isoviolanthrone, pyranthrone, dioxazine, quinophthalone, isoindolinone, isoindoline and diketopyrrolopyrrole pigments or an acidic to alkaline carbon black from the group consisting of furnace blacks and gas blacks.

Of the organic pigments mentioned, particularly suitable ones are in a very fine state of subdivision for preparing the preparations in that preferably 95% and more preferably 99% of the pigment particles have a particle size ≤500 nm.

The pigment particles advantageously have a $d_{50}$ value between 50 and 500 nm and preferably between 70 and 350 nm.

An exemplary selection of particularly preferred organic pigments includes carbon black pigments, for example gas or furnace blacks; monoazo and disazo pigments, in particular the Colour Index pigments Pigment Yellow 1, Pigment Yellow 3, Pigment Yellow 12, Pigment Yellow 13, Pigment Yellow 14, Pigment Yellow 16, Pigment Yellow 17, Pigment Yellow 73, Pigment Yellow 74, Pigment Yellow 81, Pigment Yellow 83, Pigment Yellow 87, Pigment Yellow 97, Pigment Yellow 111, Pigment Yellow 126, Pigment Yellow 127, Pigment Yellow 128, Pigment Yellow 155, Pigment Yellow 174, Pigment Yellow 176, Pigment Yellow 191, Pigment Yellow 213, Pigment Yellow 214, Pigment Red 38, Pigment Red 144, Pigment Red 214, Pigment Red 242, Pigment Red 262, Pigment Red 266, Pigment Red 269, Pigment Red 274, Pigment Orange 13, Pigment Orange 34 or Pigment Brown 41; β-naphthol and Naphthol AS pigments, in particular the Colour Index pigments Pigment Red 2, Pigment Red 3, Pigment Red 4, Pigment Red 5, Pigment Red 9, Pigment Red 12, Pigment Red 14, Pigment Red 53:1, Pigment Red 112, Pigment Red 146, Pigment Red 147, Pigment Red 170, Pigment Red 184, Pigment Red 187, Pigment Red 188, Pigment Red 210, Pigment Red 247, Pigment Red 253, Pigment Red 256, Pigment Orange 5, Pigment Orange 38 or Pigment Brown 1; laked azo and metal complex pigments, in particular the Colour Index pigments Pigment Red 48:2, Pigment Red 48:3, Pigment Red 48:4, Pigment Red 57:1, Pigment Red 257, Pigment Orange 68 or Pigment Orange 70; benzimidazoline pigments, in particular the Colour Index pigments Pigment Yellow 120, Pigment Yellow 151, Pigment Yellow 154, Pigment Yellow 175, Pigment Yellow 180, Pigment Yellow 181, Pigment Yellow 194, Pigment Red 175, Pigment Red 176, Pigment Red 185, Pigment Red 208, Pigment Violet 32, Pigment Orange 36, Pigment Orange 62, Pigment Orange 72 or Pigment Brown 25; isoindolinone and isoindoline pigments, in particular the Colour Index pigments Pigment Yellow 139 or Pigment Yellow 173; phthalocyanine pigments, in particular the Colour Index pigments Pigment Blue 15, Pigment Blue 15:1, Pigment Blue 15:2, Pigment Blue 15:4, Pigment Blue 15:6, Pigment Blue 16, Pigment Green 7 or Pigment Green 36; anthanthrone, anthraquinone, quinacridone, dioxazine, indanthrone, perylene, perinone and thioindigo pigments, in particular the Colour Index pigments Pigment Yellow 196, Pigment Red 122, Pigment Red 149, Pigment Red 168, Pigment Red 177, Pigment Red 179, Pigment Red 181, Pigment Red 207, Pigment Red 209, Pigment Red 263, Pigment Blue 60, Pigment Violet 19, Pigment Violet 23 or Pigment Orange 43; triarylcarbonium pigments, in particular the Colour Index pigments Pigment Red 169, Pigment Blue 56 or Pigment Blue 61; diketopyrrolopyrrole pigments, in particular the Colour Index pigments Pigment Red 254, Pigment Red 255, Pigment Red 264, Pigment Red 270, Pigment Red 272, Pigment Orange 71, Pigment Orange 73, Pigment Orange 81.

The structural unit B1 derives from ethylenically unsaturated sulfonic acids of the general formula (b1).

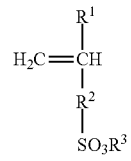
(b1)

Examples thereof are: vinylsulfonic acid, allylsulfonic acid, methallylsulfonic acid, p-styrenesulfonic acid, 2-acrylamido-2-methylpropanesulfonic acid and salts thereof. The sulfonic acid groups in the copolymer are preferably in salt form, for example as sodium, potassium or ammonium salt.

The structural unit B2 derives from esters of ethylenically unsaturated monocarboxylic acids of the general formula (b2).

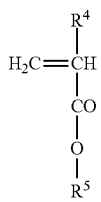

(b2)

Examples thereof are: methyl (meth)acrylate, ethyl (meth)acrylate, propyl (meth)acrylate, isopropyl (meth)acrylate, butyl (meth)acrylate, pentyl (meth)acrylate, hexyl (meth)acrylate, 2-ethylhexyl (meth)acrylate, nonyl (meth)acrylate, lauryl (meth)acrylate, phenyl (meth)acrylate, naphthyl (meth)acrylate and benzyl (meth)acrylate.

The structural unit B3 derives from vinyl esters of the general formula (b3).

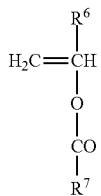

(b3)

Examples thereof are: vinyl, acetate, isopropenyl acetate, vinyl propionate, vinyl butyrate, vinyl laurate, vinyl 2-ethylhexanoate and also, more preferably, vinyl esters of a Versatic acid, where $R^7$ is branched $C_4$-$C_{18}$-alkyl and preferably branched $C_6$-$C_{12}$-alkyl, more particularly —C(CH$_3$)(R$^{70}$)(R$^{71}$) and R$^{70}$ and R$^{71}$ are alkyl groups having 6 or 7 carbon atoms in total.

The structural unit B4 derives from the olefins of the general formula (b4).

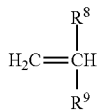

(b4)

Examples thereof are: ethylene, propylene, vinyl chloride, vinyl bromide, vinyl alcohol, acrylonitrile, styrene, methylstyrene and vinyltoluene.

The copolymers may be statistical, alternating, gradient-like or blocklike in construction. The copolymers are preferably statistical in construction.

In the preferred form of the copolymer, the average molecular weight Mw is in the range from 1000 to 50 000 g/mol. In the particularly preferred form of the copolymer, the average molecular weight Mw is in the range from 3000 to 20 000 g/mol.

Examples of customary surfactants which may be included as component (C) in the pigment preparations of the present invention are:
alkyl sulfates such as for example lauryl sulfate, stearyl sulfate or octadecyl sulfate, primary alkyl sulfonates such as for example dodecyl sulfonate, and secondary alkyl sulfonates, more particularly the $C_{13}$-$C_{17}$-alkanesulfonate sodium salt, alkyl phosphates, alkylbenzenesulfonates such as for example dodecylbenzenesulfonic acid, similarly salts of these compounds. It is further possible to use soy lecithin and also condensation products of fatty acid and taurine or hydroxyethanesulfonic acid, similarly alkoxylation products of alkylphenols, castor oil rosin esters, fatty alcohols, fatty amines, fatty acids and fatty acid amides, these alkoxylation products can be equipped with ionic end groups, for example as sulfosuccinic monoesters or else as sulfonic, sulfuric and phosphoric esters, and also their salts, the sulfonates, sulfates or phosphates. Similarly suitable are alkoxylated addition compounds obtained by reaction of polyepoxides with amines or bisphenol A or bisphenol A derivatives with amines, and also urea derivatives.

The present invention further provides a process for producing the solid pigment preparations described above, which comprises a pigment in the form of powder, granulate or press cake being mixed with at least one water-soluble dispersing additive (B) and optionally said customary auxiliaries in the presence of water or an organic solvent or a mixture of water and organic solvent and subsequently isolated in solid form.

Particularly advantageous mixing can be achieved through the use of a grinding or dispersing assembly. As such, stirred systems, dissolvers (saw-tooth stirrers), rotor-stator mills, ball mills, stirred media mills, such as sand and bead mills, high-speed mixers, kneading apparatus, roll stands or high-performance bead mills can be used. The fine dispersing/grinding of the pigments is carried on to the desired particle size distribution and can take place at temperatures in the range from 0 to 100° C., advantageously at a temperature between 10 and 70° C., preferably at 20 to 60° C.

Depending on the type of pigment, the pigment suspension thus obtained can be subjected to a finishing operation. The finishing operation is advantageously carried out in the existing organic solvent, water or water-solvent mixture at a temperature of 50 to 250° C., particularly 70 to 200° C., especially 100 to 190° C., and advantageously for a period in the range from 5 minutes to 24 hours, particularly 5 minutes to 18 hours, especially 5 minutes to 6 hours. The finishing operation is preferably carried out at the boiling temperature, especially at temperatures above the boiling point of the solvent system under superatmospheric pressure. When a purely aqueous pigment dispersion is preferred, any solvent used can be removed by means of a steam distillation.

The pigment preparations according to the present invention are isolated in solid form, for example by filtration, decanting, centrifugation, spray drying, fluidized bed drying, belt drying, spray granulation or drying in a paddle dryer. The pigment preparations according to the present invention are preferably isolated by filtration and final drying. When the pigment preparation obtained has a coarse particle size, it is advantageously additionally subjected to a grinding operation, dry grinding for example.

The present invention also provides for the use of the pigment preparations of the present invention for pigmenting and coloring natural and synthetic materials of any kind, in particular paints, coating systems, such as wallpaper colors, printing inks, emulsion and varnish colors, that are water and/or solvent containing, in particular solvent-containing paints based on alkyd resin varnishes.

The pigment preparations according to the present invention are further useful for coloration of macromolecular materials of any kind, for example natural and synthetic fiber materials, preferably cellulose fibers, but also for paper pulp dyeing and also laminate coloration. Further applications are the manufacture of printing inks, for example textile print pastes, flexographic printing inks, decorative printing colors or gravure printing inks, wallpaper colors, water-thinnable varnishes, wood preservation systems, viscose dope dyeings, varnishes, sausage casings, seed, fertilizers, glass, in particular glass bottles, and also for mass coloration of roof shingles, as colorants in electrophotographic toners and developers, for coloration of renders, concrete, woodstains, colored pencil leads, felt tip pens, waxes, paraffins, graphics inks, ballpoint pen pastes, chalks, washing and cleaning compositions, shoe care agents, latex products, abrasives and also for coloring plastics, or high molecular weight materials of any kind. High molecular weight organic materials include for example cellulose ethers and esters, such as ethylcellulose, nitrocellulose, cellulose acetate or cellulose butyrate, natural resins or synthetic resins, such as addition polymerization resins or condensation resins, for example aminoplasts, in particular urea- and melamine-formaldehyde resins, alkyd resins, acrylic resins, phenoplasts, polycarbonates, polyolefins, such as polystyrene, polyvinyl chloride, polyethylene, polypropylene, polyacrylonitrile, polyacrylic esters, polyamides, polyurethanes or polyesters, rubber, caseine, latices, silicone, silicone resins, individually or mixed.

The pigment preparations of the present invention are further useful in the manufacture of inkjet inks, for example on an aqueous or nonaqueous basis ("solvent-based"), microemulsion inks, UV-curable inks as well as those inks as function according to the hotmelt process for use in all conventional inkjet printers, in particular for those which are based on the bubble jet or piezo process. These inks can be used to print paper but also natural or synthetic fiber materials, foils, and plastics.

The pigment preparations of the present invention can further be used for printing all manner of coated or uncoated substrate materials, for example for printing paperboard, cardboard, wood and woodbase materials, metallic materials, semiconductor materials, ceramic materials, glasses, glass and ceramic fibers, inorganic materials, concrete, leather, food products, cosmetics, skin and hair. The substrate material in question may be two-dimensionally planar or spatially extended, i.e., three-dimensionally structured, and be printed or coated both completely or only partially.

The pigment preparations according to the present invention are also useful as colorants for color filters for flat panel displays not only for additive but also subtractive color generation, also for photoresists and also as colorants for electronic inks ("e-inks") or electronic paper ("e-paper").

The present invention also provides a process for coloring a high molecular weight organic material, which comprises uniformly dispersing an effectively pigmenting amount of the pigment preparation of the present invention in the organic material. Stirring is to be understood as meaning any kind of mixing using minimal shearing forces, including shaking for example. An effectively pigmenting amount is usually between 0.01% and 40% by weight of pigment preparation, based on the weight of the organic material to be pigmented.

In the examples which follow:
VeoVa® 9 (from Hexion)=vinyl ester of Versatic acid with $R^{70}+R^{71}=6$ C atoms;
VeoVa® 10 (from Hexion)=vinyl ester of Versatic acid with $R^{70}+R^{71}=7$ C atoms

EXAMPLE 1

540 g of water-moist presscake (30% by weight) of Hostaperm® Scharlach GO (Pigment Red 168, C.I. No. 59300) were suspended in 1800 g of water and admixed with 18 g of dispersing additive (copolymer of 12.5 mol % of p-styrenesulfonic acid sodium salt, 62.5 mol % of methyl (meth)acrylate and 25 mol % of VeoVa 9; Mw about 7000 g/mol, dissolved in 200 g of water). The pH was adjusted to 8-8.5 and the mixture was stirred at 80° C. for 1 hour. The surface-coated pigment was then filtered off and washed with water to a conductivity (filtrate) <0.5 mS/cm. The coated pigment was dried in a circulating drying cabinet at 80° C. and subsequently pulverized to obtain 171 g of solid pigment preparation having 94 µmol of sulfonate groups/g of pigment preparation.

EXAMPLE 2

540 g of water-moist presscake (30% by weight) of Hostaperm® Scharlach GO (C.I. No. 59300) were suspended in 1800 g of water and admixed with 9 g of dispersing additive (copolymer of 12.5 mol % of vinylsulfonic acid sodium salt, 50 mol % of vinyl acetate and 37.5 mol % of VeoVa 10®; Mw=8000 g/mol, dissolved in 100 g of water). The pH was adjusted to 8-8.5 and the mixture was stirred at 80° C. for 1 hour. The surface-coated pigment was then filtered off and washed with water to a conductivity (filtrate) <0.5 mS/cm. The coated pigment was dried in a circulating drying cabinet at 80° C. and subsequently pulverized to obtain 162 g of solid pigment preparation having 47 µmol of sulfonate groups/g of pigment preparation.

EXAMPLE 3

543 g of water-moist presscake (29.5% by weight) of Pigment Red 122 (C.I. No. 73915) were suspended in 900 g of water and admixed with 18 g of dispersing additive (copolymer of 11.1 mol % of vinylsulfonic acid sodium salt, 44.5 mol % of vinyl acetate, 33.3 mol % of VeoVa 10® and 11.1 mol % of vinyl alcohol, Mw=7500 g/mol) and 7.5 g of $C_{12}/C_{16}$-alkyl ethoxylate with 10 EO units, dissolved in 200 g of water. The pH was adjusted to 8-8.5 and 800 g of isobutanol were added thereto. The mixture was subjected to pressure finishing at 125° C. for 3 hours. The isobutanol was then distilled off by steam distillation, the coated pigment was filtered off and washed with water to a conductivity (filtrate) <0.5 mS/cm. The coated pigment was dried in a circulating drying cabinet at 80° C. and subsequently pulverized to obtain 173 g of solid pigment preparation having 87 µmol of sulfonate groups/g of pigment preparation.

To evaluate the easy dispersibility in paint systems of differing polarity, the pigment preparations from examples 1 to 6 are tested by dissolver dispersion in an air-drying long oil alkyd resin baking finish comprising white spirit (LA finish) and in a waterborne emulsion paint for exteriors (WEP).

Prescription for Pigmenting a Solventborne LA Finish

A dissolver equipped with a 4 cm toothed disk was used to disperse 15.0 g of the easily dispersible pigment preparations of examples 1 and 2 (or rather 9.6 g in the case of example 3) in 45.0 g (or rather 50.4 g in the case of example 3) of the long oil alkyd resin grind varnish (40%) for 30 min at 40° C. and 10 000 rpm. 10 g of this pigmented grind varnish were admixed at room temperature with 10 g of a letdown mix (54%) and 30 g (or rather 20 g in the case of example 3) of a clearcoat mix by slowly stirring with a glass rod.

To prepare the white reduction, 8.1 g (or rather 6.7 g in the case of example 3) of the above masstone varnish were homogenized with 30 g of long oil alkyd resin white varnish (27% of $TiO_2$, 1.5% of Octa-Soligen® 173) by simple manual stirring. The paints thus produced were drawn down as a 200 µm film on test card and dried initially at room temperature for 15 min and then at 60° C. in a drying cabinet for 60 min.

General Prescription for Pigmenting a Waterborne Emulsion Paint:

A dissolver equipped with a 4 cm toothed disk was used to disperse 36.0 g of the easily dispersible pigment preparation of examples 1 to 3 in 44.0 g of a grind mix for 30 min at 20° C. and 8000 rpm (45% millbase). To prepare the white reduction, 1.16 g of the millbase were homogenized with 50.84 g of waterborne white dispersion (20% of $TiO_2$) by simple manual stirring (1% white reduction). The paints thus produced were drawn down as a 200 μm film on test card and dried at room temperature for 60 min.

Reference examples were prepared by dispersing the pigments Hostaperm® Scharlach GO (P.R.168) and Hostaperm® Rosa E (P. R.122) from Clariant into the abovementioned varnish system using the dissolver, and compared with the pigment preparations of examples 1 to 3. The inventive pigment preparations described in the examples exhibit advantageous effects in dissolver dispersal in the hydrophobic solventborne varnish system and in the waterborne emulsion paint compared with the conventional, untreated pigments.

| Dispersing additive | LA finish color strength | dC | WEP color strength | dC |
|---|---|---|---|---|
| Example 1 | 133% | 0.87 | 136% | 1.12 |
| Example 2 | 130% | 0.80 | 140% | 0.85 |
| Example 3 | 120% | 2.00 | 105% | 0.10 | dC > 0 indicates a cleaner color being perceived.

Producing a Pigment Formulation

The pigment, in the form alternatively of powder, granulate or presscake, was pasted up in deionized water together with the dispersant and the other adjuvants and then homogenized and predispersed using a dissolver (for example from VMA-Getzmann GmbH, type AE3-M1) or some other suitable apparatus. The subsequent fine dispersal was effected using a bead mill (for example AE3-M1 from VMA-Getzmann) or else some other suitable dispersing assembly, the grinding being carried out with siliquarzite beads or zirconium mixed oxide beads of size d=1 mm, accompanied by cooling, until the desired color strength and coloristics were obtained. Thereafter, grinding media were separated off, the pigment formulation was isolated and standardized with deionized water to a concentration of about 20% and dried using a spray dryer from Büchi (Büchi 190) to obtain a dry powder.

Evaluating a Pigment Formulation

Color strength and hue were determined in accordance with DIN 55986. The aqueous pigment dispersion and the dry powder were tested (color strength and compatibilities with the medium to be colored) in a conventional waterborne emulsion paint for interiors and in a conventional solventborne lacquer. The rub-out test was carried out by applying the paint, after mixing with the pigment dispersion, to a paint card. Subsequently, the applied coating was rubbed with the finger on the lower part of the paint card. Incompatibility was present when the rubbed area is then more strongly colored than the adjacent area not aftertreated (the rub-out test is described in DE 2 638 946).

Viscosity was determined using a cone-and-plate viscometer (Roto Visco 1) from Haake at 20° C. (titanium cone: 60 mm, 1°), the relationship between viscosity and shear rate in a range between 0 and 200 s-1 being investigated. Viscosities were measured at a shear rate of 60 s-1.

To evaluate the storage stability of the dispersions, viscosity was measured directly after production of the formulation and also after four weeks' storage at 50° C.

The pigment formulation described in the example which follows was produced by the method described above, the following constituents being used in the stated amounts such that 100 parts of the pigment formulation are formed. Parts are by weight in the example below:

35 parts of C.I. Pigment Yellow 74
5 parts of dispersant from example 2
10 parts of ethoxylation product of lauryl alcohol with 7 mol of EO
50 parts of water After drying, the pigment formulation has the following composition, neglecting a residual water content of about 1%:

70 parts of C.I. Pigment Yellow 74
10 parts of dispersant from example 2
20 parts of ethoxylation product of lauryl alcohol with 7 mol of EO
with 94 μmol of sulfonate groups/g of pigment preparation The pigment formulation has high color strength in white dispersion and in lacquer, and is stable. The rub-out test shows no color strength differences compared with the rubbed area. The dry powder is spontaneously dispersible in the waterborne white dispersion and solventborne lacquer by manual stirring for 3 minutes, Both color systems give high color strength and also a nonflocculating application free of specks. The rub-out test does not show any color strength differences compared with the rubbed area.

What is claimed is:

1. A solid pigment preparation comprising
   (A) from 5% to 99% by weight of at least one pigment other than C.I. Pigment Blue 15:3,
   (B) from 1% to 95% by weight of at least one water-soluble dispersing additive based on copolymers consisting of the following structural units:
   (i) from 1.0 to 50 mol % of structural unit B1

(ii) from 50 to 99.0 mol % of structural units B2 and B3 in a total whereof
   from 0 to 100 mol % of said structural unit B2 and
   from 0 to 100 mol % of said structural unit B3 can be present,

-continued

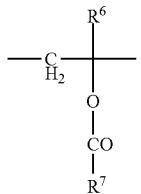
(B3)

(iii) from 0 to 49 mol % of structural unit B4

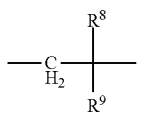
(B4)

where
R$^1$, R$^4$, R$^6$ and R$^8$ are each independently hydrogen or C$_1$-C$_4$-alkyl,
R$^2$ is a covalent bond, C$_1$-C$_4$-alkylene, C$_1$-C$_4$-alkylene-C$_6$-C$_{12}$-arylene, C$_6$-C$_{30}$-arylene or the radical

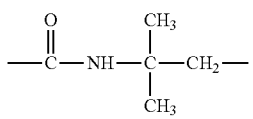

R$^3$ is hydrogen, Na$^+$, K$^+$ or N(R$^1$)$_4$$^+$,
R$^5$ and R$^7$ are each independently C$_1$-C$_{40}$-alkyl, C$_5$-C$_{30}$-cycloalkyl, C$_1$-C$_4$-alkylene-C$_6$-C$_{12}$-aryl or C$_6$-C$_{30}$-aryl, and
R$^9$ is hydrogen, C$_1$-C$_{40}$-alkyl, C$_5$-C$_{30}$-cycloalkyl, C$_6$-C$_{30}$-aryl, C$_1$-C$_4$-alkylene-C$_6$-C$_{12}$-arylene, —F, —Cl, —Br, —OH or —CN,
and wherein the aryl optionally substituted with C1-C4-alkyl;
(C) from 0% to 30% by weight of an auxiliary selected from the group consisting of fillers, flame retardants, preservatives, photoprotectants, pigmentary dispersants, nonpigmentary dispersants, surfactants, antioxidants, defoamers, resins and antistats,
all based on the total weight of the pigment preparation,
and wherein the sulfonate group content of (B1) is greater than 1 μmol and less than 100 μmol per gram of solid pigment preparation.

2. The pigment preparation as claimed in claim 1, wherein the concentration of the at least one pigment (A) is in the range of 40% to 99% by weight, based on the total weight of the pigment preparation.

3. The pigment preparation as claimed in claim 1, wherein the concentration of the at least one dispersing additive (B) is in the range of 1% to 60% by weight, based on the total weight of the pigment preparation.

4. The pigment preparation as claimed in claim 1, wherein said structural unit (B1) comprises from 5 to 30 mol %.

5. The pigment preparation as claimed in claim 1, wherein the sum total of said structural units (B2)+(B3) comprises from 60 to 95 mol %.

6. The pigment preparation as claimed in claim 1, wherein said structural unit (B4) comprises from 1 to 20 mol %.

7. The pigment preparation as claimed in claim 1, wherein the sulfonate group content of (B1) is in the range from 3 to 98 μmol/g.

8. The pigment preparation as claimed in claim 1, wherein the at least one pigment is an organic pigment selected from the group consisting of monoazo, disazo, laked azo, β-naphthol, the condensation product of beta-hydroxynaphthoic acid and aniline, benzimidazolone, disazo condensation, azo metal complex pigments, phthalocyanine, except C. I. Pigment Blue 15:3, quinacridone, perylene, perinone, thioindigo, anthanthrone, anthraquinone, flavanthrone, indanthrone, isoviolanthrone, pyranthrone, dioxazine, quinophthalone, isoindolinone, isoindoline and diketopyrrolopyrrole pigments and acidic to alkaline carbon blacks selected from the group consisting of furnace blacks and gas blacks.

9. The pigment preparation as claimed in claim 1, comprising said structural unit (B3), where said structural unit B3 R$^7$ is branched C$_{4-18}$-alkyl.

10. A process for producing a solid pigment preparation as claimed in claim 1, comprising the steps of mixing a pigment in the form of powder, granulate or presscake with at least one water-soluble dispersing additive (B) in the presence of water or an organic solvent or a mixture of water and organic solvent and isolating the pigment preparation in solid form.

11. The process for producing a solid pigment preparation as claimed in claim 10, wherein the pigment preparation is isolated in solid form by filtration, drying and subsequent grinding.

12. The process for producing a solid pigment preparation as claimed in claim 10, wherein the pigment preparation is isolated in solid form by spray drying.

13. A pigmented or colored natural or synthetic material pigmented or colored by a solid pigment preparation as claimed in claim 1.

14. The pigmented or colored natural or synthetic material as claimed in claim 13, wherein the natural or synthetic material is aqueous paints, emulsion and varnish colors, water-thinnable varnishes, wallpaper colors or printing inks.

15. The pigmented or colored natural or synthetic material as claimed in claim 13, wherein the natural or synthetic material is solvent-containing paints, emulsion, colors varnish colors, wallpaper colors or printing inks.

* * * * *